United States Patent [19]

Cole et al.

[11] 4,094,536

[45] June 13, 1978

[54] METER RISER

[75] Inventors: Judson C. Cole, Tulsa; Eldon W. Morain, Broken Arrow, both of Okla.

[73] Assignee: Continental Industries, Inc., Tulsa, Okla.

[21] Appl. No.: 752,438

[22] Filed: Dec. 20, 1976

[51] Int. Cl.² ............................................. F16L 13/02
[52] U.S. Cl. ...................................... 285/21; 285/45; 285/174; 285/353; 285/423
[58] Field of Search .................... 285/55, 45, 47, 174, 285/15, 423, 21, 353

[56] References Cited

U.S. PATENT DOCUMENTS

| | | | |
|---|---|---|---|
| 2,739,829 | 3/1956 | Pedlow et al. | 285/21 |
| 3,244,438 | 4/1966 | Bucheit | 285/55 X |
| 3,375,025 | 3/1968 | Engel | 285/15 |
| 3,817,559 | 6/1974 | Tricini | 285/47 |
| 3,819,207 | 6/1974 | Leopold | 285/45 |
| 3,922,008 | 11/1975 | Stiner et al. | 285/47 |

*Primary Examiner*—Dave W. Arola

*Attorney, Agent, or Firm*—Head, Johnson & Chafin

[57] ABSTRACT

A corrosion proof meter riser for attachment to a subsurface polyethylene pipe carrying fluid at high pressure, which comprises a length of selected polyethylene tubing adapted to be attached at a first end to said polyethylene pipe, and heat seal means and cylindrical seal for attaching the second end of the polyethylene tubing to a first end of a selected length of fiberglass tube of substantially the same radial dimensions. The fiberglass tube is molded with a circumferential ridge near its second end. A riser body, comprising a metal pipe of suitable interior diameter has a coupling at one end which is screwed to the pipe. The coupling has an internal shoulder which cooperates with the ridge on the outer surface of the fiberglass tube, so that when the joined fiberglass and polyethylene tubing is inserted into the body, the ridge rests on the shoulder and can be locked in position by a nut to seal that end of the body. The polyethylene tubing extends out from the other end of the body and is sealed by means of a pipe cap which slidably seals around the surface of the polyethylene tubing and screws onto the end of the pipe body.

6 Claims, 12 Drawing Figures

METER RISER

BACKGROUND OF THE INVENTION

This invention lies in the field of polyethylene piping. More particularly it concerns a meter riser of non-corrosive construction, which is attached at one end by heat sealing to the wall of a large pipe carrying high pressure fluid, and which extends through the upper layers of the earth and above the earth to a meter coupling.

In the prior art, the use of small diameter polyethylene tubing for meter risers has been attempted, but has not been successful in extension from a buried polyethylene pipe carrying fluid at high pressure, up through the shallow layers of the earth, and through the intervening air space, to meter or other fluid operated device suspended above the earth. Difficulty arises from the effects of sunlight, and of heat and cold on the polyethylene tubing. While polyethylene tubing is advantageous in the sense that it can be attached very simply to the subsurface pipe, it is not satisfactory as a tubing or conductor of high pressure fluid above the surface of the earth.

SUMMARY OF THE INVENTION

It is the primary object of this invention to provide a composite tubing made up of a length of polyethylene tubing of suitable size, and attachable at a first end to a polyethylene pipe, and providing a mechanical and pressure seal connection between the second end of the polyethylene tubing, and the first end of a length of fiberglass tubing of substantially the same radial dimension.

It is a further object to provide a mechanical protection for the small tubing riser by locking a larger steel pipe over the tubing so that the relatively weak inner tubing is mechanically protected from a selected depth in the earth up to the surface, and to the meter.

These and other objects are realized and the limitations of the prior art are overcome in this invention by providing a composite tubing, constructed of a first length of polyethylene tubing such as can be heat sealed or mechanically coupled to a polyethylene pipe carrying high pressure fluid. The length of polyethylene pipe is insufficient to reach to the surface, and to a meter, and is joined to a selected length of fiberglass tubing of substantially the same radial dimensions.

In one embodiment the joint between the fiberglass tubing and the polyethylene tubing is facilitated by means of a collar of polyethylene which sealably slides on the end of the fiberglass tubing. The collar is counterbored at the coupling end, to slide over a thin ring of fiberglass which is cemented around the end of the fiberglass tubing. Thus, the collar can be moved toward the end of the fiberglass tubing, and it will pass over the fiberglass ring. A corresponding collar, or cup, of polyethylene is attached to the polyethylene tubing, and the two ends of the polyethylene tubing and fiberglass tubing are placed in coaxial end contact, and the polyethylene collar is heat sealed to the polyethylene cup.

In another embodiment a collar is injection molded onto the end of the fiberglass tube.

This joined composite tubing is then inserted into a steel pipe, or body for mechanical protection. It is sealed at the fiberglass end by means of a circumferential ridge on the fiberglass tube which is pressed against the pipe coupling. The polyethylene end is sealed by means of a pipe cap which is drilled out to sealably slide on the polyethylene as it is screwed over the end of the pipe body.

BRIEF DESCRIPTION OF THE DRAWINGS

These and other objects and advantages of this invention and a better understanding of the principles and details of the invention will be evident from the following description taken in conjunction with the appended drawing, in which.

DESCRIPTION OF THE PREFERRED EMBODIMENT

Figure 2:
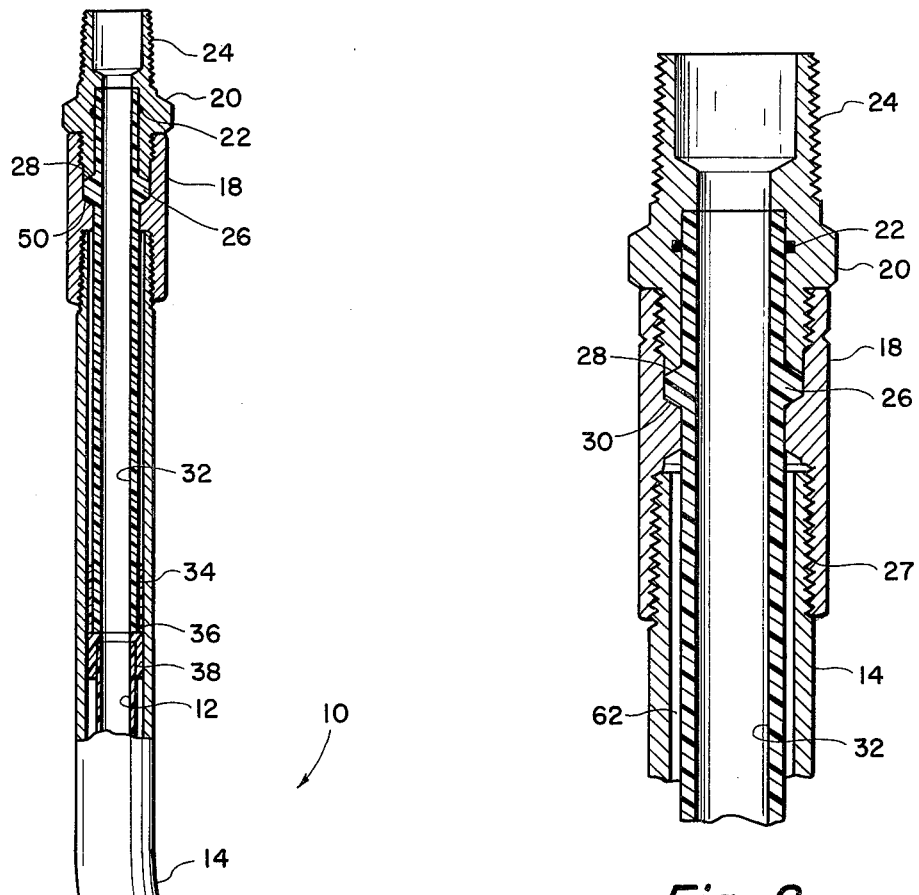
FIG. 2 illustrates the detailed construction of the meter end of the riser.
Figure 1:
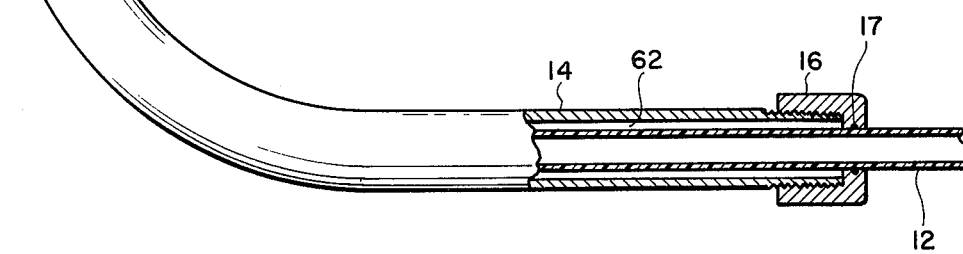
FIG. 1 illustrates, in partial cross-section, one overall embodiment of this invention.
Figure 3:
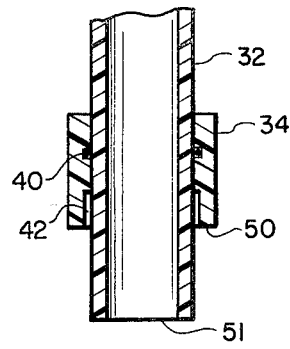
FIGS. 3 to 8 illustrate various details of construction of a mechanical and pressure sealed joint between the polyethylene and fiberglass tubings.
Figure 4:
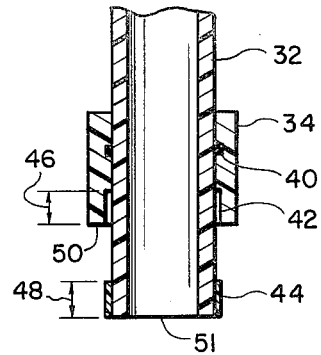

Referring now to the drawings and in particular to FIGS. 1 and 2, there is shown an assembled view of the meter riser, labeled generally by the numeral 10. This comprises a length of polyethylene tubing 12 which is joined to the pipe at its first end (not shown) and at its second end by means of an adaptor coupling 38 to a coupling collar 34 attached to a first end of a length of fiberglass tube 32. The fiberglass tube has a circumferential ridge 26 near its second end. As will be explained in connection with FIGS. 3 to 8, which describe the method of joining the fiberglass tube 32 to the polyethylene tubing 12, there is a body portion comprising a steel pipe 14 to provide mechanical protection to the riser. A line shield nut 18 is threaded over the upper end of the body, and has an internal shoulder 30 against which seals the circumferential ridge 26 of the fiberglass tube.

After the line shield nut is attached to the upper end of the body, the joined polyethylene and fiberglass tubings are inserted through the line shield nut until the circumferential ridge 26 is in contact with the shoulder 30. An adaptor coupling nut 20 screws into the other end of the line shield nut, and presses against the upper surface 28 of the circumferential ridge 26. By tightening the adaptor coupling nut 20, there is pressure on the circumferential ridge 26 to provide adequate seal between the ridge and the line shield nut shoulder. The adaptor coupling nut 20 is provided with threads 24, or other means, for attachment to an instrument meter, or other device.

FIG. 2 shows the upper end of FIG. 1 to greater detail. Here is shown the fiberglass tube 32 with a circumferential ridge 26, which is inserted through the line shield nut 18, which is screwed over the end of the body 14. The adaptor coupling nut 20 is screwed into the upper threads of the line shield nut 18 and presses down on the upper surface 28 of the circumferential ridge 26 which is near the upper or second end of fiberglass tube, to provide the seal between the fiberglass tube and the line shield nut, which is itself sealed to the body by means of the threads 27. Additional seal is provided between the adaptor coupling nut 20 and the end of the fiberglass tubing by means such as an "O" ring 22, such as is well known in the art.

Figure 5:
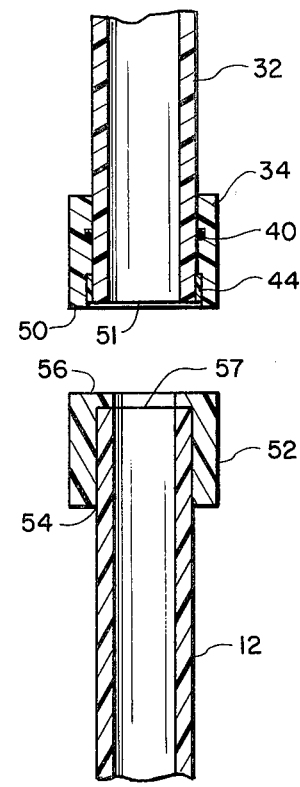

Turning now to FIGS. 3–8, FIG. 3 shows the first or lower end, that is, the end opposite to the ridge 26 of the fiberglass tube 32. This end 51 will be joined to the second or upper end 57 of the polyethylene tubing 12 (FIG. 5). There is a collar 34 made of polyethylene tube which is adapted to slide along the outer surface of the fiberglass tube 32, and is sealed by means such as "O" ring 40. There is a counterbore 42 on the inner surface of the lower end of the collar 34. There is attached to the end 51 of the fiberglass tubing 32 a thin circumferential ring 44 (FIG. 4) which is sealed by a suitable cement, or apoxy, for example. This ring is of a length 48, and a radial thickness which is adapted to slide within the counterbore 42 which is of corresponding length 46 and radial opening, of the collar 34. Thus the collar 34 can be pressed down over the ring 44, so that the bottom surface 50 of the collar will extend slightly beyond the end 51 of the fiberglass tubing 32 (FIG. 5).

The second end 57 of the polyethylene tubing 12 has a bushing, or inverted cup 52, placed over its end, the cup being drilled out to the same internal diameter as the tubing 12. This cup 52 is sealed by appropriate means along the circumferential walls 54, and at the end of the end 57 of the tubing, so that the coupling 52 is an integral part of the tubing 12.

Figure 6:
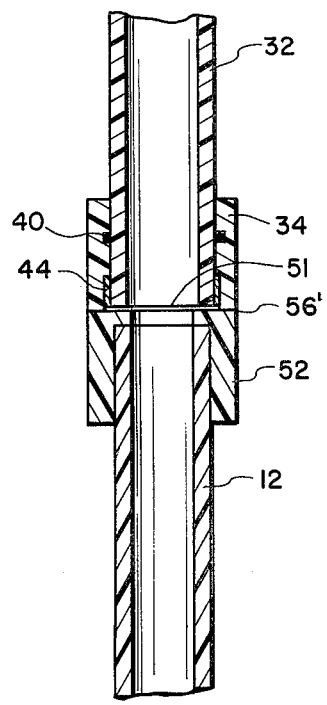

The next step is illustrated in FIG. 6, in which the two tubings, fiberglass tube 32 and the polyethylene tubing 12 are placed end to end, and coaxial, whereby the collar 34 can be pressed intimately in contact with the top surface 56 of the adaptor coupling 32. By proper preheating of the two surfaces 50, 56, they can be pressed together and joined in a firm bond as is well known in the art. Once they have been joined, then the fiberglass tube 34 is locked in position by the circumferential ring 44, and is sealed by the "O" ring or other means 40. In general, the construction shown in FIG. 6, particularly the flashing along the joining plane 56' will be of larger diameter than the final values, and it will be desirable to turn down the outer surface 58 of the joined tubes, to some lesser value 60, which will be of a diameter that can be slid into the inner opening of a pipe 14, which will be the body of the meter riser.

Figure 7:
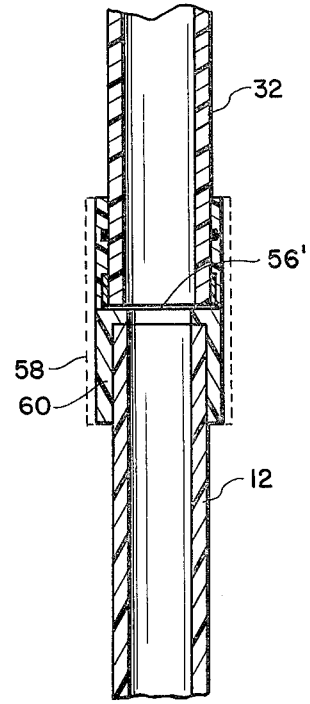
Figure 8:
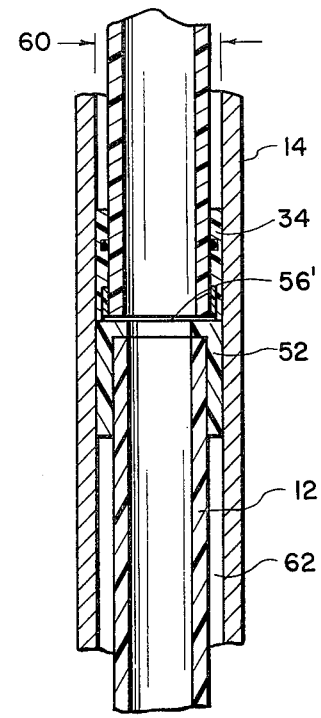

After the two tubings 12 and 32 are joined in the manner illustrated in FIGS. 3, 4, 5, 6, and 7, the tubings are inserted in the top of the body 14, polyethylene pipe first, and the condition is as illustrated in FIG. 8, which is a view of FIG. 7 with the body surrounding the joint in the two tubings. After the joint is made and the tubings are inserted into the body 14, the upper end is sealed by tightening the adaptor coupling nut into the line shield nut, to lock and seal the circumferential ridge 26 against the shoulder 30 and seal the upper end of the body pipe 14.

As shown in FIG. 1, the first or lower end of the body 14 is sealed by a pipe cap 16, which is bored out to slide along the outer surface of the first end of the polyethylene tubing 12. An "O" ring 17 is provided on the inner surface of the bored out portion, so that the pipe cap 16 can be slid over the end of the polyethylene tubing and threaded onto the tightened against the end of the body 14, to provide a suitable mechanical attachment and seal to the internal space inside 62 of the body.

Figure 10:
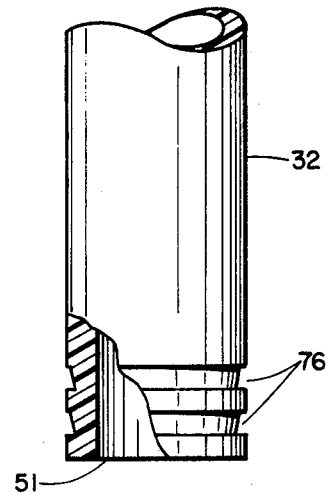
FIGS. 9–11 illustrate a second embodiment of a mechanical and pressure sealed joint between the polyethylene and fiberglass tubings.
Figure 9:
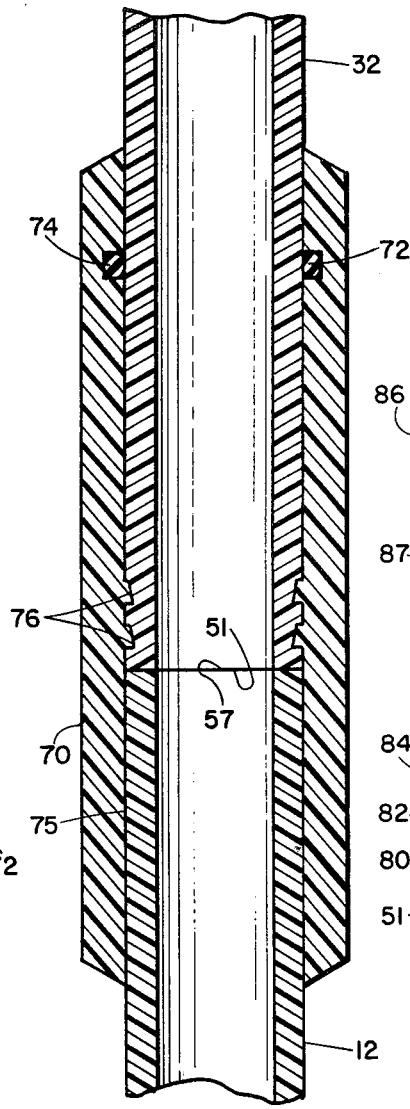
Figure 11:
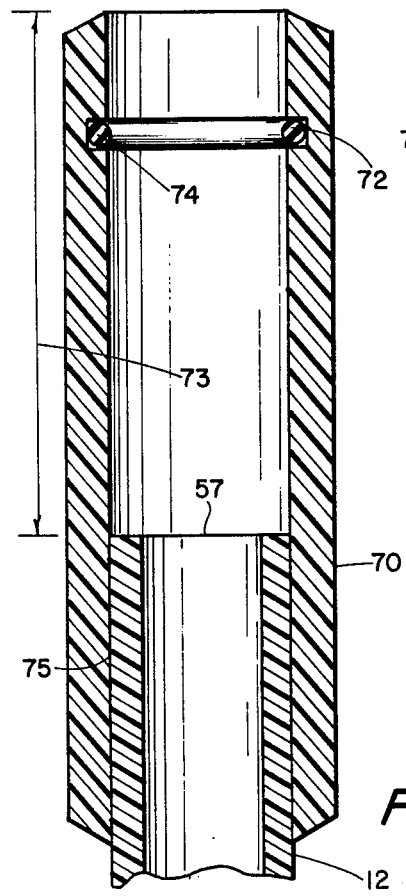

Referring now to FIGS. 9, 10 and 11, there is shown a second embodiment of a coupling joint that has mechanical strength and is pressure sealed between the polyethylene tubing 12 and the fiberglass tube 32. A polyethylene coupling collar 70 is sealingly attached to the polyethylene tubing 12 by attachment and sealing along the circumferential surface 75, by thermal attachment as is well known in the art. The coupling collar 70 extends for a distance 73 beyond the end 57 of the tubing 12. There is a groove 72 near the upper end of the coupling cylider 70 which contains an O ring 74 for sealing the circumferential surface between the internal surface of the coupling collar 70 and the outer surface of the fiberglass tube, shown in FIG. 10.

Near the lower end 51 of the fiberglass tube 32 are one more circumferential grooves 76. The purpose of these grooves is to lock the fiberglass tube into the collar 70, by softening the outer surface of the coupling cylinder 70 in the region of the grooves 76, after the fiberglass tube 32 has been inserted into the cylinder with its lower edge 51 and is in contact with the upper edge 57 of the tubing 12. When this coupling collar 70 is softened, it can be squeezed circumferentially to cause some of the polyethylene of the cylinder to flow into and lock into, the grooves 76, and thus provide a mechanical attachment between the fiberglass tube 32 and the polyethylene tubing 12. The O ring which is made of high temperature material, such as Buna N and Viton will provide the pressure seal.

The shape of the groove, or grooves 76 is not critical, so long as they are deep enough, and wide enough so that material from the collar 70 can be pressed into the grooves and therefore provide a locking of the two tubes together, as shown in FIG. 9.

Figure 12:
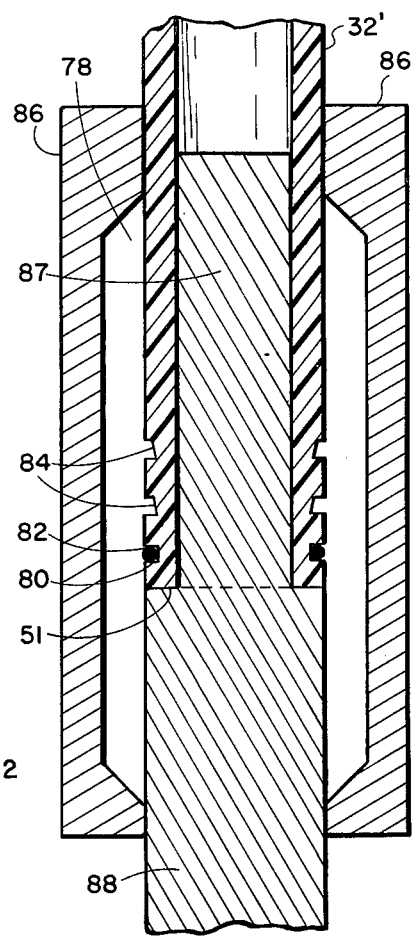
FIG. 12 illustrates another embodiment similar in some ways to FIG. 9 but manufactured in a different way.

In FIG. 12 is shown another embodiment which is similar in some ways to that of FIG. 9, but is manufactured in a different way. Shown in FIG. 12 is a fiberglass tube 32' having an end 51, and a plurality of encircling grooves near the end 51. One groove 80 is prepared for an O ring 82 in the conventional manner. Other grooves 84 are provided for the purpose of locking the tube 32' to a polyethylene coupling collar. The end 51 of the fiberglass tube 32' is supported by a metal plug 87, 88. The portion 87 is the same diameter as the interior surface of the fiberglass. The portion 88 has the same diameter as that of the outer surface of the polyethylene tubing 12. The polyethylene injection mold 86 has a cavity 78 of the general shape of a coupling collar 70 of FIG. 9. The mold is conventional, in that polyethylene can be molded under pressure around the outer surface of the fiberglass tube 32', filling the grooves 84 and pressing against the O ring 80. The surface of the rod 88 is treated so that the polyethylene will not adhere to it. After the molding has taken place, the plug 88 can be withdrawn from the collar 78 and the fiberglass tube 32'.

Thereafter the tubing 12 and the molded collar 78 can both be heated to softening temperature, and the tubing 12 can be heat sealed to the collar so that the two are sealed and joined together, and the coupling is then completed.

The O ring is made of a high temperature material such as Buna N or Viton. Both materials are available on the market and will stand temperatures from 400° to 420° F. which is sufficiently high to heat fuse the polyethylene tubing to the collar. This injection molding process is the preferable embodiment.

What has been described is a composite riser tubing made of polyethylene tubing in the lower subsurface part which attaches to the line pipe, and having fiberglass tube in the upper part which extends above ground. The riser tubing is sealed into and protected by a steel body which is sealed to the polyethylene tubing at the lower end, and attaches to the meter at the upper end.

Several embodiments of attachment and sealing between a fiberglass tube 22 and the polyethylene tubing 32 are shown in the drawings which illustrate several methods by which the tubes can be attached and sealed.

The invention has been described as it relates specifically to attaching a polyethylene pipe to fiberglass pipe. The transition is required to provide a fluid tight coupling from low ambient heat tolerant polyethylene pipe which may safely be employed for gas distribution at above ground ambient temperatures. The high ambient heat tolerant pipe is preferably fiberglass, however, it may also be of metal. Thus, throughout the description it is understood that where a fiberglass pipe is discussed, a metal pipe or any other pipe of high ambient heat tolerant characteristics and non-reactive to the gas or other product flowing through the pipe, may be employed.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A meter rising comprising:
   (a) a length of small diameter polyethylene pipe adapted for attachment at one end to a line pipe carrying a fluid under pressure;
   (b) a selected length of high ambient heat tolerant tube of substantially the same diameter as said polyethylene pipe having a first end adjacent the second end of said polyethylene pipe.
   (c) cup-like polyethylene bushing with a central opening placed over and attached and sealed at the second end of said polyethylene pipe;
   (d) a short length polyethylene sealing tube received on said high ambient heat tolerant tube at its first end, and including sealing means between and sealingly engaging the inside surface of said sealing tube and the outer surface of said high ambient heat tolerant tube, said bushing being heat sealed to said sealing tube in coaxial relationship; and
   (e) a meter riser body surrounding said high ambient heat tolerant tube and a portion of said polyethylene pipe comprising a selected length of metal pipe surrounding said joined pipe and tube and including means to seal said riser body to said high ambient heat tolerant tube and means to attach said riser body to a meter or the like.

2. A meter riser as in claim 1 including: a thin cylindrical ring attached around the first end of said high ambient heat tolerant tube, and whereon one end of said sealing tube is counterbored for passage over the cylindrical ring, the counterbore being such that when said sealing tube is moved over said ring it will extend beyond the first end of said high ambient heat tolerant tube.

3. A meter riser according to claim 1 wherein said sealing means between the inside surface of said sealing tube and the outer surface of said high ambient heat tolerant tube includes an O-ring.

4. A meter riser according to claim 1 wherein said high ambient heat tolerant tube is of fiberglass.

5. A meter riser according to claim 1 wherein said high ambient heat tolerant tube is of metal.

6. The meter riser as in claim 1 in which said means to seal said riser body to said high ambient heat tolerant tube comprises:
   (a) a circumferential ridge element near the second end of said high ambient heat tolerant tube;
   (b) a line shield nut screwed to said riser body and including an internal shoulder against which rests said ridge element; and
   (c) an adapter coupling threaded into said line shield nut to lock and seal said ridge against said shoulder.

* * * * *